United States Patent
Cottuli et al.

(10) Patent No.: US 12,438,377 B2
(45) Date of Patent: Oct. 7, 2025

(54) FUEL CELL BASED MICROGRID

(71) Applicant: BLOOM ENERGY CORPORATION, San Jose, CA (US)

(72) Inventors: Carl Cottuli, San Jose, CA (US); Prasad Pmsvvsv, San Jose, CA (US); Ranganathan Gurunathan, San Jose, CA (US); Beau Baker, San Jose, CA (US); Edwin Pho, San Jose, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 11 days.

(21) Appl. No.: 18/361,266

(22) Filed: Jul. 28, 2023

(65) Prior Publication Data

US 2024/0039291 A1    Feb. 1, 2024

(51) Int. Cl.
*H02J 3/38* (2006.01)
*H02J 3/28* (2006.01)
*H02J 3/46* (2006.01)

(52) U.S. Cl.
CPC ............... *H02J 3/381* (2013.01); *H02J 3/28* (2013.01); *H02J 3/46* (2013.01); *H02J 2300/30* (2020.01)

(58) Field of Classification Search
CPC ...... H02J 3/381; H02J 3/28; H02J 3/46; H02J 2300/30
See application file for complete search history.

(56) References Cited

U.S. PATENT DOCUMENTS

| | | | |
|---|---|---|---|
| 9,368,973 B2 | 6/2016 | Creed | |
| 10,168,722 B2 | 1/2019 | Forbes, Jr. | |
| 10,322,637 B2 * | 6/2019 | Srinivasan | H02J 3/381 |
| 10,444,806 B2 | 10/2019 | Brockman et al. | |
| 10,756,546 B2 * | 8/2020 | Pmsvvsv | H02J 3/32 |
| 11,050,260 B2 * | 6/2021 | Narla | H02J 3/38 |
| 11,742,778 B2 * | 8/2023 | Son | H01M 8/04567 |
| | | | 307/43 |
| 11,757,117 B2 * | 9/2023 | Zaag | H01M 8/04559 |
| | | | 429/432 |
| 2013/0071698 A1 * | 3/2013 | Yemul | H02J 3/381 |
| | | | 429/458 |

(Continued)

OTHER PUBLICATIONS

The implementation framework of a microgrid: A review, Sheetal Chandak, Pravat K. Rout, Aug. 31, 2020, pp. 8-9, India.

*Primary Examiner* — Daniel Kessie
*Assistant Examiner* — Brian K Baxter
(74) *Attorney, Agent, or Firm* — Evergreen Valley Law Group; Kanika Radhakrishnan

(57) ABSTRACT

A system for fuel cell based microgrid is provided. The system includes a plurality of fuel cell modules to generate DC power. The system includes a plurality of dual-mode inverters (DMIs) to convert the DC power into AC power. The system includes a plurality of DC switches to electrically connect or disconnect a fuel cell module from a DC bus. The DC bus is electrically coupled to the plurality of the DC switches. The plurality of DMIs includes a first set of DMIs, second set of DMIs, and a third set of DMIs. The first set is configured to electrically connect a first set of fuel cell modules with a grid. The second set of DMIs is configured to electrically connect a second set of fuel cell modules with a first load. The third set of DMIs is configured to electrically connect the DC bus with the first load.

7 Claims, 7 Drawing Sheets

(56) References Cited

U.S. PATENT DOCUMENTS

| | | | |
|---|---|---|---|
| 2013/0147276 A1* | 6/2013 | Yamamoto | H02J 3/381 |
| | | | 307/64 |
| 2014/0063874 A1* | 3/2014 | Liu | H02J 3/381 |
| | | | 363/40 |
| 2014/0132075 A1* | 5/2014 | Fishman | H02J 3/381 |
| | | | 307/82 |
| 2016/0179991 A1* | 6/2016 | Chen | G06F 30/20 |
| | | | 703/18 |
| 2016/0181809 A1* | 6/2016 | Chiang | H02J 3/381 |
| | | | 307/82 |
| 2017/0025856 A1* | 1/2017 | Herold | H02J 3/381 |
| 2017/0047742 A1* | 2/2017 | Narla | H02J 3/381 |
| 2017/0250568 A1* | 8/2017 | Gross | G06F 1/263 |
| 2018/0131226 A1* | 5/2018 | Narla | H02S 40/38 |
| 2019/0229535 A1* | 7/2019 | Pmsvvsv | H02J 9/06 |
| 2020/0266658 A1* | 8/2020 | Cottuli | H01M 8/04604 |
| 2021/0359540 A1* | 11/2021 | Pmsvvsv | H02J 1/10 |
| 2021/0359623 A1* | 11/2021 | Pmsvvsv | H02J 1/106 |
| 2023/0086269 A1* | 3/2023 | Chen | H02H 3/087 |
| | | | 361/86 |
| 2023/0146218 A1* | 5/2023 | Pmsvvsv | H02J 3/007 |
| | | | 307/43 |
| 2023/0238804 A1* | 7/2023 | Mesnage | H02M 7/66 |
| | | | 307/82 |

* cited by examiner

US 12,438,377 B2

FUEL CELL BASED MICROGRID

TECHNICAL FIELD

The present disclosure relates to power electronic systems and, more particularly, to systems related to the sizing of microgrid installations.

BACKGROUND

In recent times, microgrids have been widely used for connecting and transferring power from distributed energy resources (DERs) to a variety of local loads such as households, industries, offices, etc., that are not connected to a public grid. The DERs used in the microgrid are typically renewable energy sources such as fuel cell and solar panel installations that produce direct current (DC) power. Most loads operate on alternating current (AC) power, and the DC power from the DERs needs to be converted into AC power for feeding electricity to the loads. The conversion of DC power to AC power is performed by an inverter, and the DERs are associated with one or more inverters. In addition to providing AC power to the loads, excess power from the microgrid can also be transferred to the public grid. An example configuration of such a microgrid is depicted in FIG. 1, where the fuel cell modules 106 are part of the DERs.

As shown in FIG. 1, for every fuel cell module 106, there is a current source inverter (CSI) 104 installed for command and control of the fuel cell module 106 and attached to the public grid 102. Further, a voltage source inverter (VSI) 112 is installed with each fuel cell module 106 to service a critical load 114 (i.e., the customer's off-grid load). The energy produced from the fuel cell modules 106 is prioritized to feed the critical load 114 first and excess energy is then exported to the grid 102. All DC generation is paralleled together in a single large common DC bus 116.

A consequence of the configuration 100 in FIG. 1 is that the microgrid requires the same grid connection capacity as the installed fuel cell capacity. This leads to an increase in capital cost requirements and interconnection resources to increase the size of the grid connection capacity. In particular, the configuration 100 in FIG. 1 requires installation of high inverter capacity (e.g., 22 inverters counting each CSI 104 and VSI 112) to support limited fuel cell capacity (e.g., 11 fuel cell modules 106). In practical scenarios, all the inverters may never be simultaneously loaded, but are required to support the full use case of the installation.

There can be scenarios where grid interconnection is constrained and cannot grow to meet a rising fuel cell capacity. In these conditions, the inability to meet the interconnection requirements of the grid can delay the progress of the installation of additional fuel cell modules and requires upgrading of the grid infrastructure. Meeting the grid interconnection requirements for increased fuel cell capacity requires installing more complex metering systems, such as telemetry equipment to provide data to the grid 102 about high generation quantities of the fuel cell modules. Further, these telemetry equipment requirements can complicate the interconnection approvals and make expansion of the fuel cell capacity expensive.

Therefore, there exists a need to improve installations and configurations of microgrid installations utilizing fuel cell DERs.

SUMMARY

Various embodiments of the present disclosure describe systems for sizing microgrid installations when there is a large difference between existing grid export capacity and the intended sizing of fuel cell installations.

In one embodiment, a system is provided. The system includes a plurality of fuel cell modules to generate direct current (DC) power. Each fuel cell module includes a stack of fuel cells. The system further includes a plurality of dual-mode inverters (DMIs) to convert the DC power into alternating current (AC) power. Each DMI is configured to operate either as a current source inverter (CSI) or a voltage source inverter (VSI). Further, the system includes a plurality of DC switches, where each DC switch is configured to electrically connect or disconnect a fuel cell module from a DC bus. The DC bus is electrically coupled to the plurality of the DC switches. The plurality of DM's includes a first set of Mils configured to electrically connect a first set of the plurality of fuel cell modules with a grid. Further, the plurality of DMIs includes a second set of DMIs configured to electrically connect a second set of the plurality of fuel cell modules with a first load (e.g., a critical load). Thereafter, the plurality of DMIs includes a third set of DMIs configured to electrically connect the DC bus with the first load.

In another embodiment, a microgrid network is provided. The microgrid network includes a plurality of systems, where each system of the plurality of systems includes a first terminal and a second terminal. The second terminal is electrically connected to a first load. The microgrid network further includes a transfer switch electrically connected to the first terminal, a grid, and a second load. Each system includes a plurality of fuel cell modules to generate direct current (DC) power, where each fuel cell module includes a stack of fuel cells. Further, the system includes a plurality of dual-mode inverters (DMIs) to convert the DC power into alternating current (AC) power. Each DMI is configured to operate either as a current source inverter (CSI) or a voltage source inverter (VSI). Furthermore, the system includes a plurality of DC switches, where each DC switch is configured to electrically connect or disconnect a fuel cell module from a DC bus. The DC bus is electrically coupled to the plurality of the DC switches. The plurality of DMIs includes a first set of DMIs configured to electrically connect a first set of the plurality of fuel cell modules with the first terminal. Further, the plurality of DMIs includes a second set of DMIs configured to electrically connect a second set of the plurality of fuel cell modules with the second terminal. Furthermore, the plurality of DMIs includes a third set of DMIs configured to electrically connect the DC bus with the second terminal. The transfer switch is configured to send signals to the first set of DMIs of the plurality of systems.

In another embodiment, a microgrid network is provided. The microgrid network includes a plurality of systems, where each system of the plurality of systems includes a first terminal and a second terminal. The second terminal is electrically connected to a first load. The microgrid network further includes a transfer switch electrically connected to the first terminal, a grid, and the first load. Each system further includes a plurality of fuel cell modules to generate direct current (DC) power, where each fuel cell module includes a stack of fuel cells. Further, the system includes a plurality of dual-mode inverters (DMIs) to convert the DC power into alternating current (AC) power, where each DMI is configured to operate either as a current source inverter (CSI) or a voltage source inverter (VSI). Furthermore, the system includes a plurality of DC switches, where each DC switch is configured to electrically connect or disconnect a fuel cell module from a DC bus. The DC bus is electrically coupled to the plurality of the DC switches. The plurality of DMIs includes a first set of DMIs configured to electrically connect a first set of the plurality of fuel cell modules with the first terminal. Further, the plurality of DMIs includes a second set of DMIs configured to electrically connect a second set of the plurality of fuel cell modules with the second terminal. Furthermore, the plurality of DMIs includes a third set of DMIs configured to electrically connect the DC bus with the second terminal. The transfer switch is configured to send signals to the first set of DMIs of the plurality of systems.

BRIEF DESCRIPTION OF THE DRAWINGS

The following detailed description of illustrative embodiments is better understood when read in conjunction with the appended drawings. For the purpose of illustrating the present disclosure, exemplary constructions of the disclosure are shown in the drawings. However, the present disclosure is not limited to specific devices, tools or instrumentalities disclosed herein.

Figure 1:
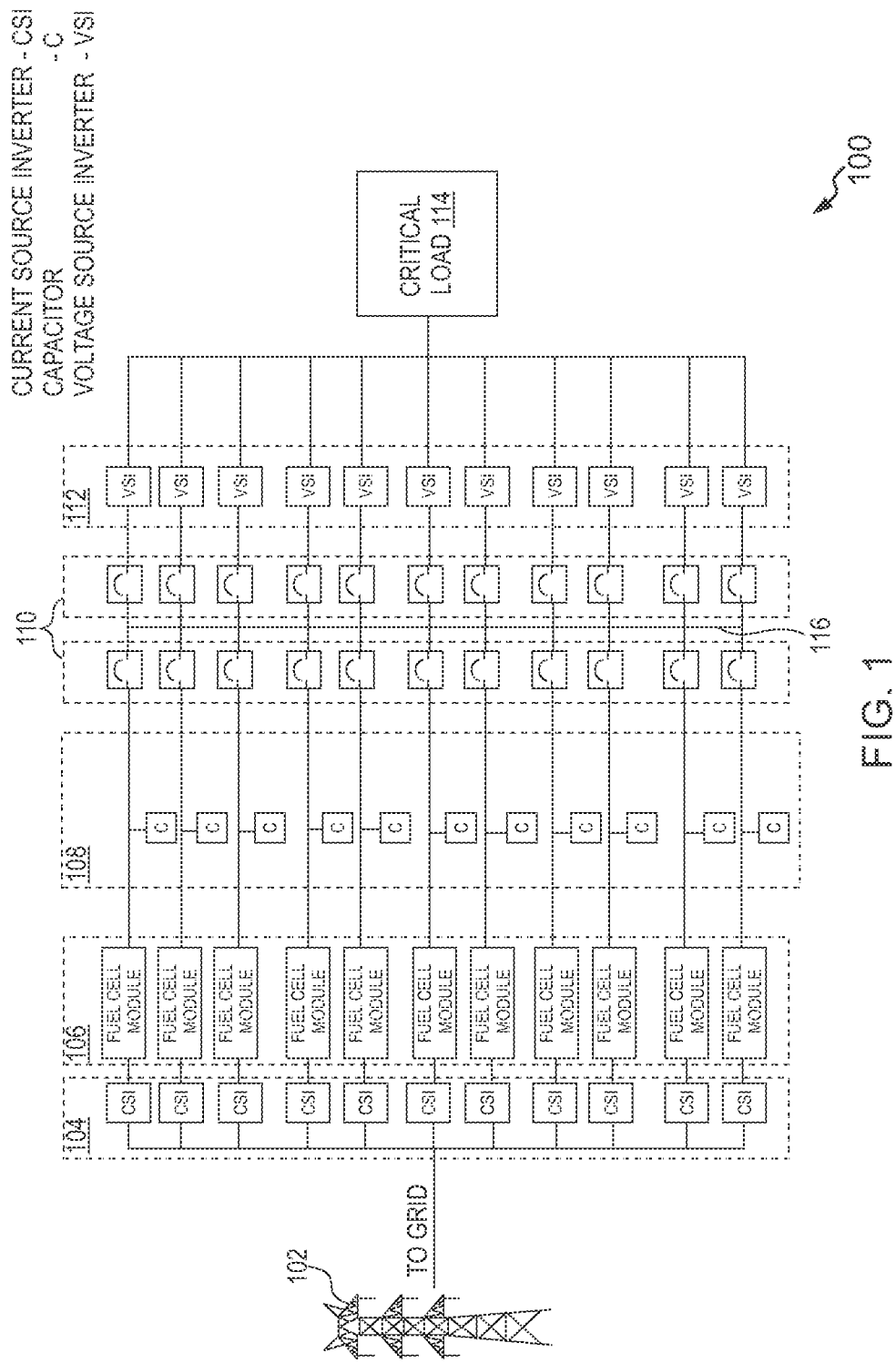
FIG. 1 depicts a configuration for grid connection with a microgrid installation, in an example scenario.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide systems related to the sizing of the microgrid installations when there is a large difference between existing grid export capacity and the intended sizing of fuel cell installation. The term "sizing" indicates dynamically increasing or decreasing the capacity of handling electrical power.

For example, if a site has a 1 MVA power export limitation to a utility (such as a public grid 102) and it is desired to add a large 5 MVA off-grid load 114 (such as a consumer's off-grid load or critical load), then at least 5 MW capacity of fuel cells must be installed to support that load (such as the critical load 114). It is noted that in the existing standard configurations (e.g., the configuration in FIG. 1), it would result in 5 MW of export potential to the public grid 102, which complicates meeting grid interconnection standards as well as requires double the inverter capacity for providing power to the grid 102 as well the load 114. Furthermore, only some of the inverters 104 and 112 are functional when the power is being fed to the load 114 or when the power is being fed to the grid 102, leading to the ineffective utilization of the inverters 104 and 112 as well as redundant installation of the inverters 104 and 112. Further, to adjust to the rise in the demand from the load 114, there is an increase in the capacity of the power that can be provided to the grid 102, which may require the installation of additional infrastructure to meet the grid interconnection standards for transferring such large amount of power to the grid 102.

The present invention provides embodiments to address the drawbacks of existing microgrid configurations. The systems disclosed in the present invention are related to improving the flexibility in the usage of inverters to more easily comply with interconnection standards and decouple the sizing of the grid export capacity from the size of the fuel cell installation.

In one example embodiment, the present invention provides a system to decouple the concept of fuel cell capacity from the concept of grid interconnection capacity. In order to decouple the concepts, the roles of the current source inverter 104 and voltage source inverter 112 in FIG. 1 are combined into a single dual-mode inverter, which will be explained later with reference to FIG. 2. In general, command and control of the fuel cell modules 106 are handled in a current-source inverter 104, but excluded in a voltage-source inverter 112 because the working assumption is that the voltage-source inverter 112 would only be present alongside an existing current-source inverter 104. By combining the roles of the inverters 104 and 112 and forming dual mode inverters, the voltage source inverters 112 can also act as command and control modules to a set of fuel cell modules 106.

The usage of dual-mode inverters allows the installation of a number of fuel cell modules 106 matched against the needs of the customer's off-grid loads (i.e., critical load 114) and still keeps one dual-mode inverter per fuel cell module 106 to be used for command and control purposes. Further, the number of dual-mode inverters to be attached to the grid 102 and the customer's off-grid load 114 can be different, which is determined based on the capacity required by the grid 102 and the customer's off-grid load 114, individually.

Figure 2:
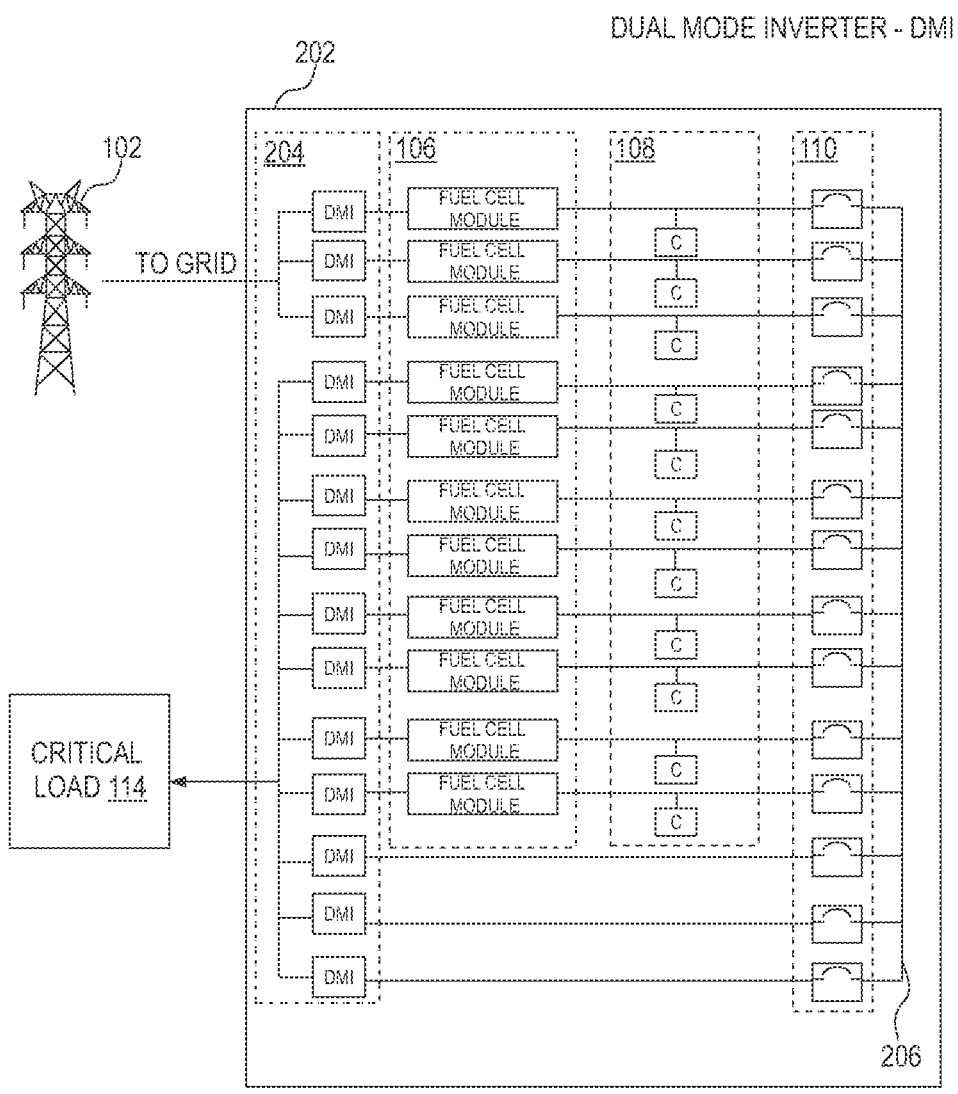
FIG. 2 depicts a schematic representation of a microgrid installation to provide power to a grid and a critical load, in accordance with an embodiment of the present disclosure.

FIG. 2 depicts a configuration 200 for a microgrid installation to provide power to a grid and a critical load, in accordance with an embodiment of the present disclosure. The configuration 200 depicts an energy supply system 202 including dual-mode inverters (DMI) 204, fuel cell modules 106, capacitors 108, direct current (DC) switches 110, and a DC bus 206. Further, the energy supply system 202 is connected to the grid 102 and the critical load 114 (customer's off-grid load).

The dual-mode inverter (DMI) 204 is an inverter that is formed by combining the roles of the voltage source inverter (VSI) 112 with the current source inverter (CSI) 104. The DMI 204 is configured to function either as the VSI 112 or the CSI 104 based on usage requirements. For example, the DMI 204 connected to the utility (such as the public grid 102) is configured to function as CSI 104, whereas the DMI 204 connected to the critical load 114 is configured to function as VSI 112. The DMI 204 switches from one mode of operation into another mode upon receiving signals from external circuitry, which will be explained later with reference to FIG. 6.

The fuel cell modules 106 can include stacks of fuel cells (such as a solid oxide fuel cells (SOFCs)) configured to generate electrical energy by oxidizing fuel. The fuel cell modules 106 are installed to provide electrical energy to the load 114. Since the fuel cell modules 106 produce DC power, prior conversion of the DC power into alternating current (AC) power is required before providing AC power to the load 114. Such conversion is performed by the dual mode inverters 204. In addition to providing AC power to the load 114, the AC power can be transferred to the grid 102 when the load 114 does not require AC power from the fuel cell modules 106.

The capacitors 108 are configured to store electrical energy produced by the fuel cell modules 106. The capacitors 108 can be ultra-capacitors configured to store a large amount of electrical energy. Each capacitor 108 is connected to a node connecting a fuel cell module 106 and a DC switch 110.

The DC switches 110 are switching devices that are configured to either connect or disconnect the fuel cell modules 106 from the DC bus 206. Further, the DC switches 110 may connect or disconnect the capacitors 108 from the DC bus 206. The DC bus 206 is an interface to which all the fuel cell modules 106 are connected to provide the DC power.

Using an exemplary set of parameters, in the example configuration of FIG. 2, eleven fuel cell modules 106 of individual capacity 300 kW are installed to generate 3300 kW of electrical power for serving a customer off-grid load of 2600 kW. The capacity of the electrical power required by the customer off-grid load (interchangeably referred to as 'critical load' or 'load') 114 is used to determine the number of fuel cell modules 106 required based on the individual capacity of the fuel cell modules 106, where the total power of the fuel cell modules 106 should be greater than the power required by the load 114. In an example embodiment, the ratio of the power of the fuel cell modules installed to the power required by the load 114 is 3300:2600, which is chosen to maintain a ten percent conservative margin as well as to provide N+1 coverage for the loss of a single fuel cell module 106, where N is the minimum number of the fuel cell modules 106 needed to provide the required power to the load 114. For example, in FIG. 2, ten fuel cell modules 106 of 300 kW are at least required to meet the minimum power requirements of the load 114 of 2860 kW which is ten percent above the actual power required by the load 114 after considering fuel cell aging. Therefore, a total of eleven fuel cell modules 106 are installed to provide the power required by the load 114 as well as to ensure the continuity of the power even if a fuel cell module 106 fails. Further, the fuel cell modules 106 are also configured to provide a power of 1000 kVA to the grid 102.

To provide the power to the load 114 as well as the grid 102, DMIs 204 are installed in connection with the fuel cell modules 106, where each fuel cell module 106 is connected to at least one DMI 204. The DMIs 204 depicted in FIG. 2 have a power rating of 355 kVA. The power requirements of the grid 102 (i.e., 1000 kVA) can be handled by three DMIs 204 of power rating (355 kVA) connected to three fuel cell modules 106, whereas eight 355 kVA DMIs 204 associated with eight fuel cell modules 106 are connected to meet the minimum required power (2600 kW) of the load 114. However, eight 355 kVA DMIs 204 are not adequate to source the maximum load of 2600 kW if the power factor is poor—for example, at 0.85 power factor. Considering the power factor of 0.84, the power required for catering a requirement of 2600 kW of load 114 is 3058 kW, which cannot be met by eight 355 kVA DMIs 204 as their maximum capacity is 2840 kVA. Therefore, additional three DMIs 204 are installed that do not connect to any fuel cell modules 106 but the three DMIs 204 are sourced from the large DC bus 204 directly.

In FIG. 2, the DMIs 204 connected to the load 114 are configured to operate as VSIs 112, whereas the DMIs 204 connected to the grid 102 are configured to operate as CSIs 104. Switching the mode of operation of the DMIs 204 will be explained later with reference to FIGS. 3 to 5A-5B. The number of DMIs 204 connected to the grid 102 is determined based on the grid interconnection standards and grid requirements. Calculating the number of DMIs 204 connected to the grid 102 is independent of the additional installation of the fuel cell modules 106 to meet the increasing power requirements of the customer's off-grid load 114 (critical load or load). The remaining DMIs 204 are connected directly to the customer's off-grid load 114.

Further, the additional installation of the fuel cell modules 106 in the system 202 will not increase the amount of the power delivered to the grid 102 because the number of fuel cell modules 106 connected to the grid 102 is determined based on the grid interconnection requirements. Since the amount of power provided to the grid 102 is independent of the total number of fuel cell modules 106, there is no requirement for the installation of additional infrastructure to meet the interconnection requirements of the grid 102 if more fuel cell modules 106 are added to the system 202. However, in the conventional systems such as in FIG. 1, additional installation of the fuel cell modules 106 may increase the power delivered to the grid 102 since all of the fuel cell modules 106 are connected to the grid 102. Connecting all the fuel cell modules 106 to the grid 102 may lead to the installation of additional infrastructure (such as the inverters and the metering telemetry circuits needed to meet the grid interconnection standards) in addition to the inverters 104 to provide high power to the grid 102. In contrast, as per the present invention, as depicted in FIG. 2, additional DMIs 204 will only be added with additional fuel cell modules 106 installed to meet any increase in the power required by the critical load 114 without adding any DMIs 204 to connect with the grid 102.

The technical effect associated with the configuration in FIG. 2 as compared to that of FIG. 1 is that number of inverters 104, 112, and 204 required to serve the fuel cell modules 106 of identical capacity is twenty-two in FIG. 1 and fourteen in FIG. 2. The embodiment reflected in FIG. 2 results in a reduction in the number of resources such as inverters required to be associated with eleven fuel cell modules 106. The inverter capacity required to handle fuel cell module power of 3300 kW is 4970 kW in FIG. 2, which is less when compared to the inverter capacity of 7810 kW in FIG. 1.

The number of fuel cell modules 106, DMIs 204, and capacitors 108 used in the scenario of FIG. 2 are for explanation purposes only, and any number of fuel cell modules 106, DMIs 204, and capacitors 108 can be interconnected using the teachings of the present invention. Further, the power ratings of the fuel cell modules 106 and DMIs 204 used in FIG. 2 are for example purposes only, and other fuel cell modules 106 and DMIs 204 with different power ratings can be used based on requirements.

Figure 3:
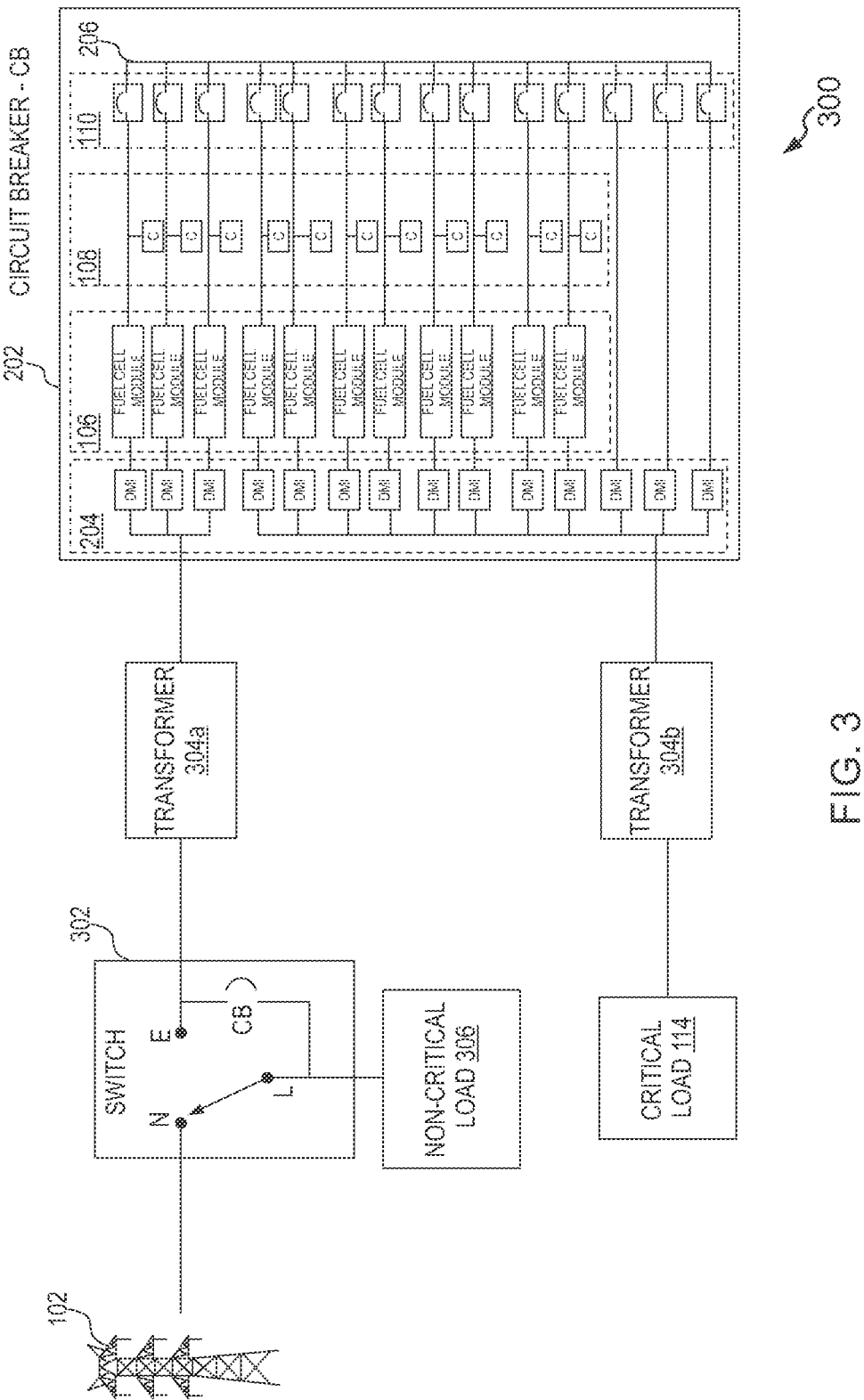
FIG. 3 depicts a schematic representation of a microgrid installation to provide power to a grid, a critical load, and a non-critical load, in accordance with an embodiment of the present disclosure.

FIG. 3 depicts a schematic representation of a configuration 300 for a microgrid installation to provide power to a grid 102, a critical load 114, and a non-critical load 306, in accordance with an embodiment of the present disclosure. The configuration 300 in FIG. 3 is similar to the configuration 200 in FIG. 2, however, the configuration 300 includes a transfer switch 302 and transformers 304a and 304b. The transformer 304a is in series connection with the switch 302 and the DMIs 204 to be connected to the grid 102. The transformer 304b is in series connection with the critical load 114 and the DMIs 204. The addition of the switch 302 to the grid-connected DMIs 204 results in adding flexibility to serving the loads and maximizes inverter utilization.

In FIG. 3, the switch 302 is connected to the non-critical load 306 that has been receiving power from the grid 102. Further, the switch 302 includes a circuit breaker (CB) that is connected between the DMIs 204 and the non-critical load 306. If there is an outage in the grid 102, then the non-critical load 306 is served by the DMIs 204 associated with the grid 102. In order to serve the non-critical load 306 from the fuel cell modules 106, the CB opens, and the switch 302 transitions to an emergency (E) node. The switch 302 further sends a signal to the DMIs 204 associated with the grid 102 to switch their mode of operation to VSI 112 from CSI 104. The switch 302 sends this signal to the DMIs 204 associated with the grid 102 when there is a fault in the grid 102. Further, the DMIs 204 serving the non-critical load 306 are configured to have lesser priority compared to the DMIs 2024 serving the critical load 114 (customer's off-grid load), such that if the DC capacity becomes limited, the DMIs 204 sourcing the non-critical load 306 will disconnect.

Figure 4:
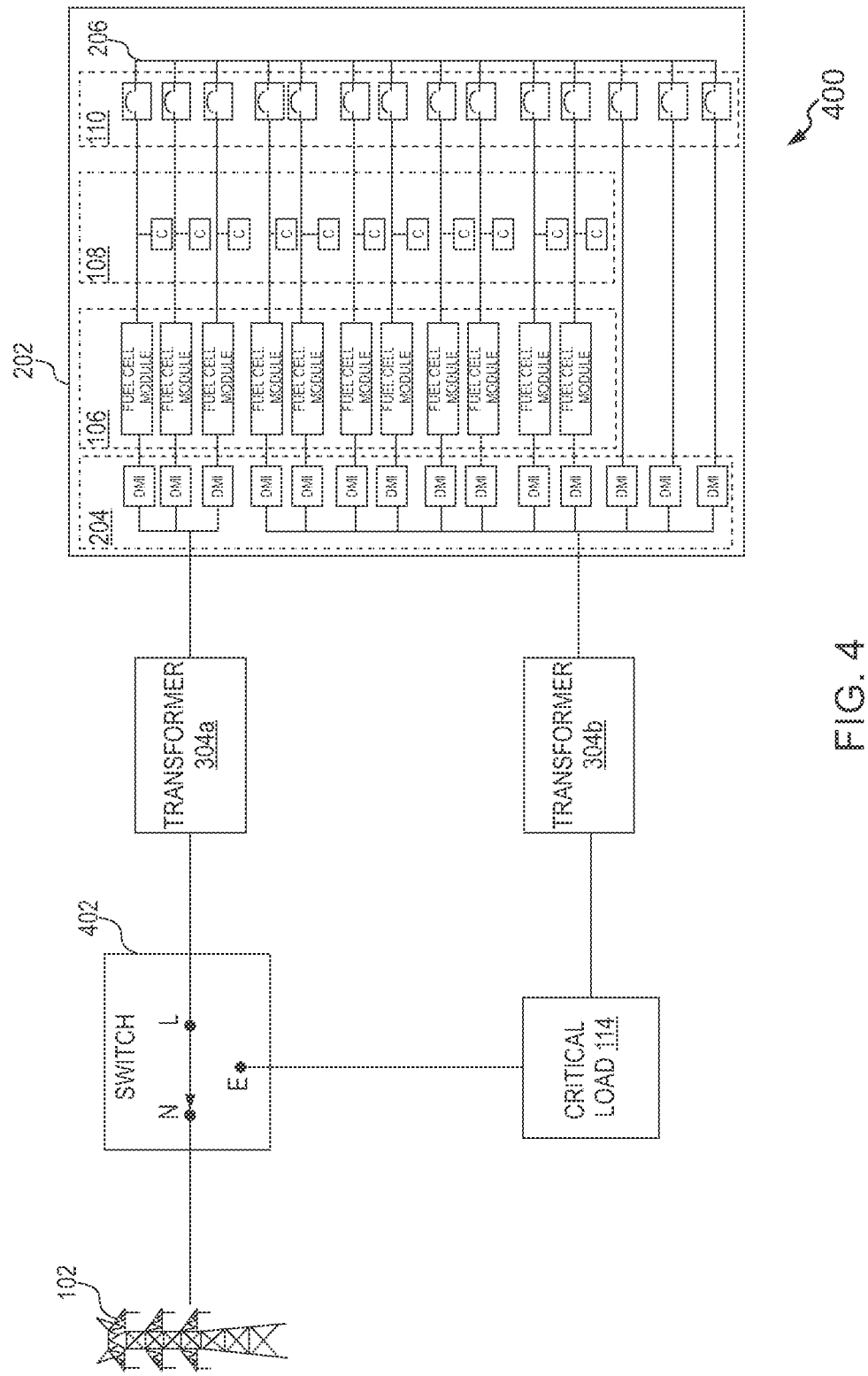
FIG. 4 depicts another schematic representation of a microgrid installation to provide power to a grid and a critical load, in accordance with an embodiment of the present disclosure.

FIG. 4 depicts a schematic representation of another configuration 400 for a microgrid installation to provide power to a grid 102 and a critical load 114, in accordance with an embodiment of the present disclosure. The configuration 400 in FIG. 4 is similar to the configuration 300 in FIG. 3, however, the configuration 400 includes a switch 402 that can connect or disconnect the DMIs 204 associated with the grid 102 to the critical load 114 or the grid 102. In FIG. 4, the switch 402 allows the grid-connected DMIs 204 to serve the critical load 114 whenever the grid 102 is unavailable, thereby providing additional power capacity for starting in-rush currents and also improving redundancy.

In FIG. 4, the switch 402 is connected to the grid 102 that has been receiving power from the fuel cell modules 106. If there is an outage in the grid 102, then the critical load is served by the DMIs 204 that are associated with the grid 102. In order to serve the critical load 114 from the fuel cell modules 106, the switch 402 transitions to emergency (E) node. The switch 402 further sends a signal to the DMIs 204 associated with the grid 102 to switch their mode of operation to VSI 112 from CSI 104. The switch 402 sends this signal to the DMIs 204 associated with the grid 102 when there is a fault in the grid 102.

Figure 5A:
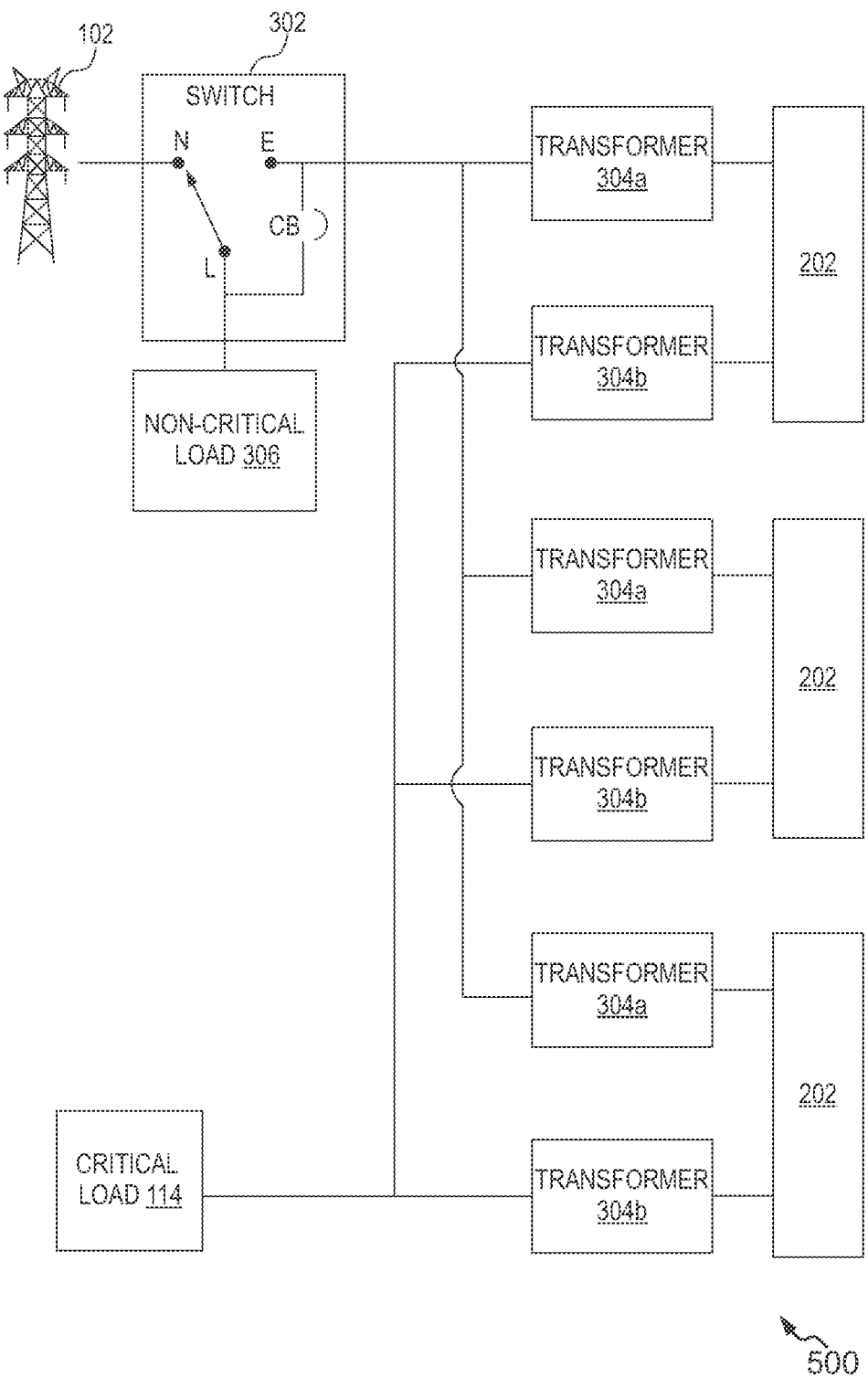
FIG. 5A exemplarily depicts an arrangement in which multiple energy supply systems are connected to the grid, the critical load, and the non-critical load, in accordance with an embodiment of the present disclosure.

FIG. 5A depicts an arrangement 500 in which multiple energy supply systems 202 are connected to the grid 102, the critical load 114, and the non-critical load 306, in accordance with an embodiment of the present disclosure. The arrangement 500 in FIG. 5A is similar to the configuration 300 in FIG. 3, however, the arrangement 500 depicts multiple such configurations 300 to serve the grid 102, the critical load 114, and the non-critical load 306. Each system 202 has two terminals to provide power to the critical load 114, and the grid 102 or the non-critical load 306. The switch 302 disconnects the grid-connected DMIs 204 when there is a fault in the grid 102. The switch 302 transitions to the emergency (E) node connecting the DMIs 204 associated with the grid 102 to the non-critical load 306. In FIG. 5A, the number of systems 202 shown are three for exemplary purposes, however, more or less number of systems 202 can be included in the arrangement 500.

Figure 5B:
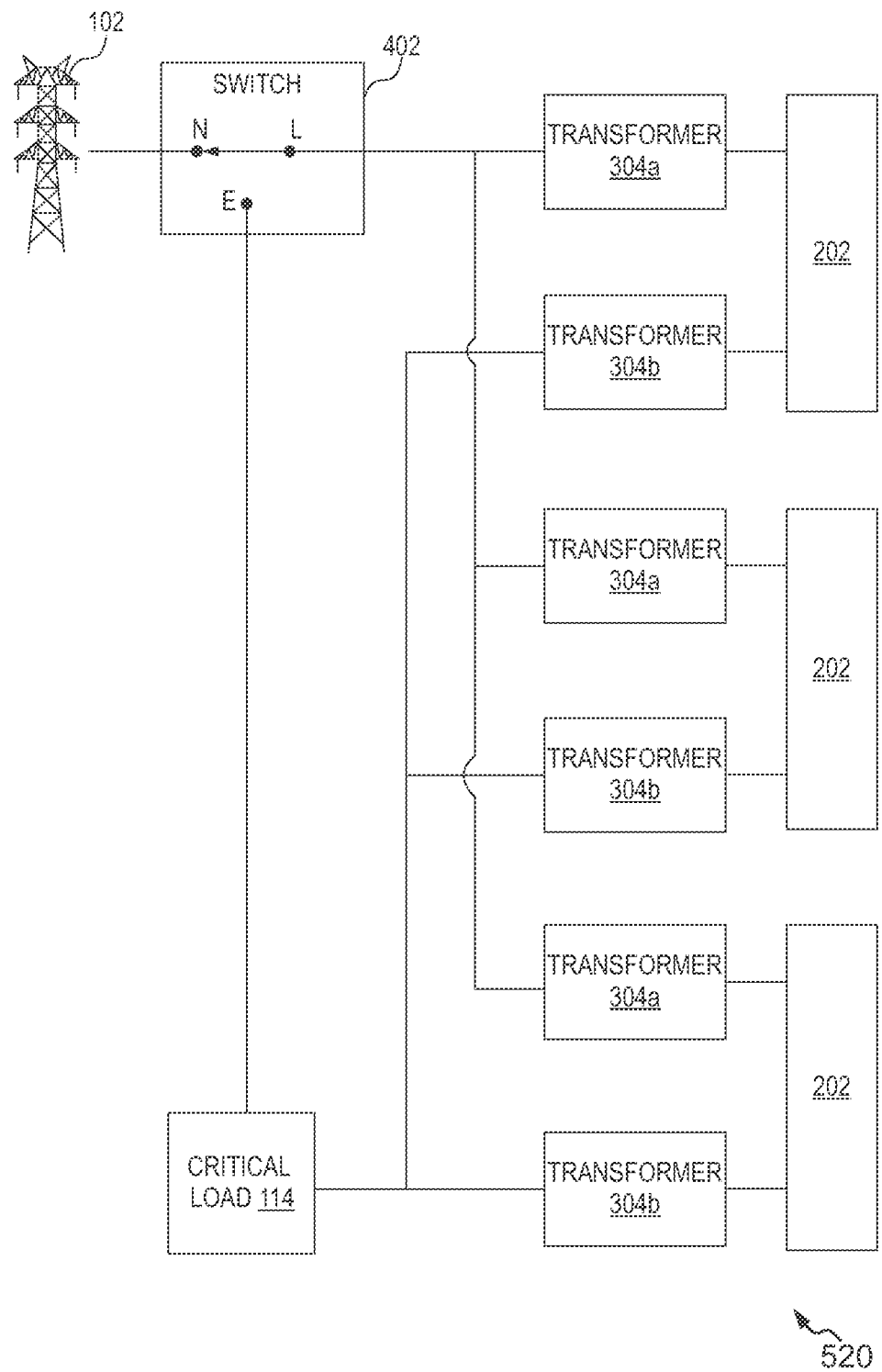
FIG. 5B exemplarily depicts an arrangement in which multiple energy supply systems are connected to the grid and the critical load, in accordance with an embodiment of the present disclosure.

FIG. 5B depicts an arrangement 520 in which multiple energy supply systems 202 are connected to the grid 102 and the critical load 114, in accordance with an embodiment of the present disclosure. The arrangement 500 in FIG. 5A is similar to the configuration 400 in FIG. 4, however, the arrangement 500 depicts multiple such configurations 400 to serve the grid 102 and the critical load 114. The switch 402 disconnects the grid-connected DMIs 204 when there is a fault in the grid 102. The switch 402 transitions to the emergency (E) node connecting the DMIs 204 associated with the grid 102 to the critical load 306. Each system 202 has two terminals to provide power to the critical load 114 and the grid 102. In FIG. 5B, the number of systems 202 shown is three for exemplary purposes, however, more or less number of systems 202 can be included in the arrangement 520.

Figure 6:
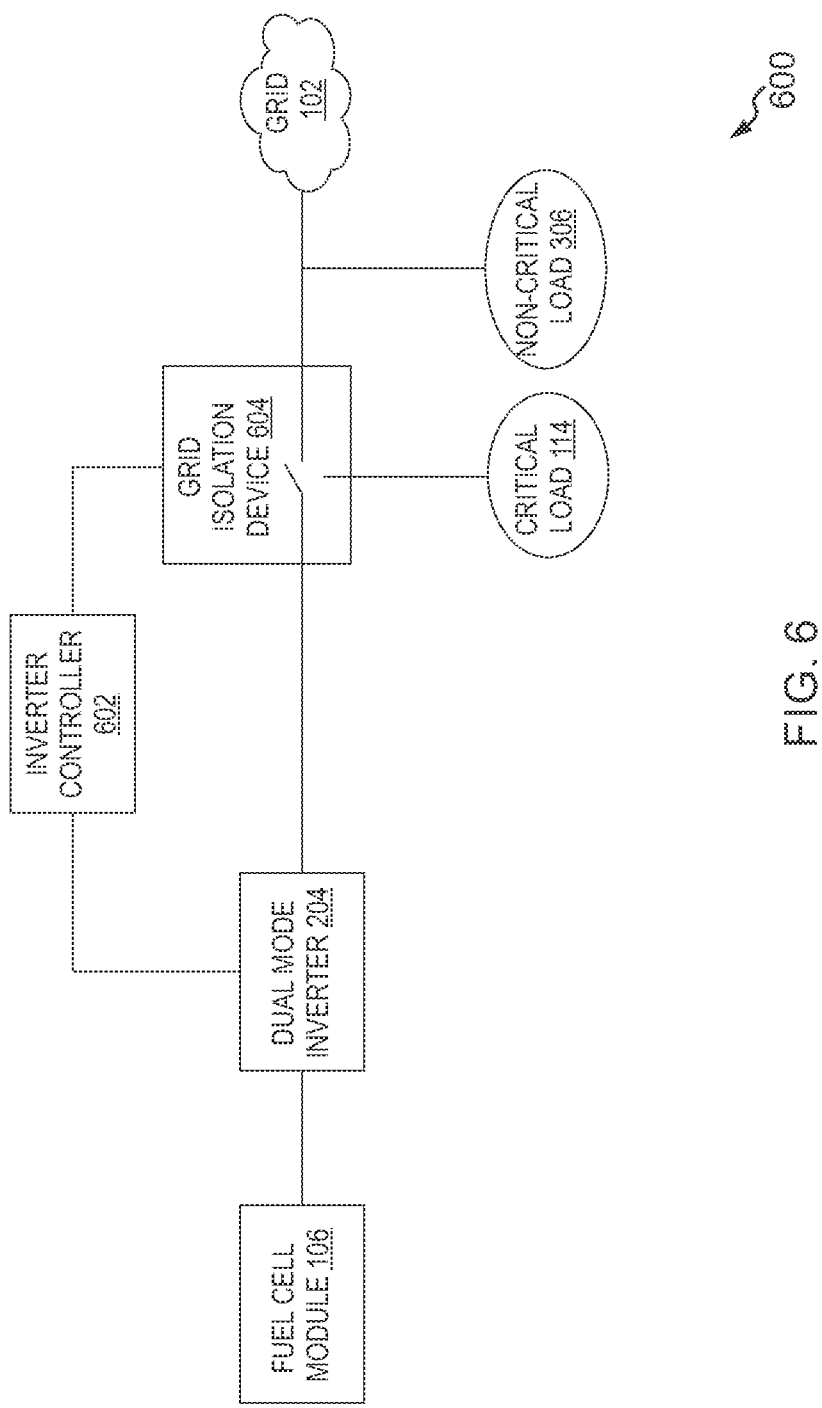
FIG. 6 exemplarily depicts another schematic representation of a microgrid installation to provide power to a grid, a critical load, and a non-critical load, in accordance with an embodiment of the present disclosure.

FIG. 6 depicts a configuration 600 for a microgrid installation to provide power to a grid 102, a critical load 114, and a non-critical load 306, in accordance with an embodiment of the present disclosure. The configuration 600 depicts a fuel cell module 106 connected to a dual mode inverter (DMI) 204. Further, the configuration 600 includes an inverter controller 602 to control the mode of operation of the DMI 204. In one example embodiment, the inverter controller 602 can be external to the DMI 204, whereas, in other embodiments, the inverter controller 602 can be a part of the DMI 204. The inverter controller 602 is also connected to a grid isolation device 604 which is similar to the switches 304 and 402. The inverter controller 602 reads the status of the grid isolation device 604 and commands the DMI 204 to switch its mode of operation (either as CSI 104 when connected to the grid 102 or VSI 112 when connected to the critical load 114).

For example, when the grid isolation device 604 detects that the grid 102 and the non-critical load 306 are unavailable, the grid isolation device 604 will disconnect the grid 102 from the DMI 204 and connect the critical load 114 to the DMI 204. The DMI 204 functioning as CSI 104 will change its operation to VSI 112 when it receives a signal from the inverter controller 602.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A system, comprising:
a plurality of fuel cell modules to generate direct current (DC) power, each fuel cell module of the plurality of fuel cell modules comprising a stack of fuel cells;
a plurality of dual mode inverters (DMIs) to convert the DC power into alternating current (AC) power, each DMI of the plurality of DMIs configured to operate as one of current source inverter (CSI) and voltage source inverter (VSI);
a plurality of DC switches, each DC switch of the plurality of DC switches configured to electrically connect or disconnect a corresponding fuel cell module of the plurality of fuel cell modules from a DC bus electrically coupled to the plurality of the DC switches; and
a transfer switch,
wherein a first set of DMIs from the plurality of DMIs is configured to electrically connect a first set of the plurality of fuel cell modules with a grid,
wherein the transfer switch is electrically connected to the first set of DMIs from the plurality of DMIs, the grid, and a load among a first load and a second load, wherein the transfer switch is configured to electrically connect the first set of DMIs from the plurality of DMIs with the grid in a first state, wherein, in the first state, the first set of DMIs are disconnected with the load, and wherein the transfer switch is configured to electrically connect the first set of DMIs from the plurality of DMIs with the load in a second state, wherein, in the second state, the first set of DMIs are disconnected with the grid,
wherein a second set of DMIs from the plurality of DMIs is configured to electrically connect a second set of the plurality of fuel cell modules with the first load, and
wherein a third set of DMIs from the plurality of DMIs is configured to electrically connect the DC bus with the first load.

2. The system as claimed in claim 1, where the transfer switch is configured to send signals to the first set of DMIs from the plurality of DMIs when the transfer switch transitions from the first state to the second state or from the second state to the first state, and wherein the signals indicate the first set of DMIs from the plurality of DMIs to change a mode of operation of the first set of DMIs from the plurality of DMIs from CSI to VSI or from VSI to CSI.

3. The system as claimed in claim 1, further comprising an inverter controller electrically connected to the first set of DMIs from the plurality of DMIs and the transfer switch, wherein the inverter controller is configured to:
detect a change in a state of the transfer switch; and
send signals to the first set of DMIs from the plurality of DMIs to change a mode of operation of the first set of DMIs from the plurality of DMIs from CSI to VSI or from VSI to CSI, upon detection of the change in the state of the transfer switch.

4. The system as claimed in claim 1, wherein the first set of DMIs from the plurality of DMIs is configured to operate as CSI to serve the grid, and wherein the second and third set of DMIs from the plurality of DMIs are configured to operate as VSI to serve the first load.

5. The system as claimed in claim 1, further comprising a plurality of capacitors, each capacitor of the plurality of capacitors connected to at least one fuel cell module of the plurality of fuel cell modules and configured to store DC power from the at least one fuel cell module of the plurality of fuel cell modules.

6. A microgrid network, comprising:
a plurality of systems, each system of the plurality of systems comprising a first terminal and a second terminal, the second terminal being electrically connected to a first load; and
a transfer switch electrically connected to the first terminal, a grid, and a second load,
wherein each system of the plurality of systems further comprises:
a plurality of fuel cell modules to generate direct current (DC) power, each fuel cell module of the plurality of fuel cell modules comprising a stack of fuel cells;
a plurality of dual mode inverters (DMIs) to convert the DC power into alternating current (AC) power, each DMI of the plurality of DMIs configured to operate as one of current source inverter (CSI) and voltage source inverter (VSI); and
a plurality of DC switches, each DC switch of the plurality of DC switches configured to electrically connect or disconnect a corresponding fuel cell module of the plurality of fuel cell modules from a DC bus electrically coupled to the plurality of the DC switches,
wherein a first set of DMIs from the plurality of DMIs is configured to electrically connect a first set of the plurality of fuel cell modules with the first terminal,
wherein a second set of DMIs from the plurality of DMIs is configured to electrically connect a second set of the plurality of fuel cell modules with the second terminal,
wherein a third set of DMIs from the plurality of DMIs is configured to electrically connect the DC bus with the second terminal, and
wherein the transfer switch is configured to electrically connect the first set of DMIs from the plurality of DMIs with the grid in a first state, wherein, in the first state, the first set of DMIs are disconnected with the load, wherein the transfer switch is configured to electrically connect the first set of DMIs from the plurality of DMIs with the first load in a second state, and wherein the transfer switch is configured to send signals to the first set of DMIs from the plurality of DMIs of the plurality of systems, wherein, in the second state, the first set of DMIs are disconnected with the grid.

7. A microgrid network, comprising:

a plurality of systems, each system of the plurality of systems comprising a first terminal and a second terminal, the second terminal being electrically connected to a first load; and a transfer switch electrically connected to the first terminal, a grid, and the first load, wherein each system of the plurality of systems further comprises:

a plurality of fuel cell modules to generate direct current (DC) power, each fuel cell module of the plurality of fuel cell modules comprising a stack of fuel cells;

a plurality of dual mode inverters (DMIs) to convert the DC power into alternating current (AC) power, each DMI of the plurality of DMIs configured to operate as one of current source inverter (CSI) and voltage source inverter (VSI);

a plurality of DC switches, each DC switch of the plurality of DC switches configured to electrically connect or disconnect a corresponding fuel cell module of the plurality of fuel cell modules from a DC bus electrically coupled to the plurality of the DC switches, wherein a first set of DMIs from the plurality of DMIs is configured to electrically connect a first set of the plurality of fuel cell modules with the first terminal, wherein a second set of DMIs from the plurality of DMIs is configured to electrically connect a second set of the plurality of fuel cell modules with the second terminal, and wherein a third set of DMIs from the plurality of DMIs is configured to connect the DC bus with the second terminal, and wherein the transfer switch is configured to electrically connect the first set of DMIs from the plurality of DMIs with the grid in a first state, wherein, in the first state, the first set of DMIs are disconnected with the load, wherein the transfer switch is configured to electrically connect the first set of DMIs from the plurality of DMIs with the second load in a second state, and wherein the transfer switch is configured to send signals to the first set of DMIs from the plurality of DMIs of the plurality of systems, wherein, in the second state, the first set of DMIs are disconnected with the grid.

* * * * *